(12) United States Patent
Alexander

(10) Patent No.: US 10,327,538 B2
(45) Date of Patent: Jun. 25, 2019

(54) METHOD AND APPARATUS FOR SUPPORTING AND TRANSPORTING PERSONAL PORTABLE DEVICES USING MAGNETS

(71) Applicant: Hugh D. Alexander, Snellville, GA (US)

(72) Inventor: Hugh D. Alexander, Snellville, GA (US)

( * ) Notice: Subject to any disclaimer, the term of this patent is extended or adjusted under 35 U.S.C. 154(b) by 117 days.

(21) Appl. No.: 15/687,457

(22) Filed: Aug. 26, 2017

(65) Prior Publication Data

US 2018/0064235 A1 Mar. 8, 2018

Related U.S. Application Data

(60) Provisional application No. 62/380,123, filed on Aug. 26, 2016.

(51) Int. Cl.
| | |
|---|---|
| *A45F 5/02* | (2006.01) |
| *A45C 13/10* | (2006.01) |
| *A45C 11/00* | (2006.01) |
| *F16B 1/00* | (2006.01) |

(52) U.S. Cl.
CPC ............ *A45F 5/02* (2013.01); *A45C 13/1069* (2013.01); *A45C 2011/002* (2013.01); *A45F 2200/0516* (2013.01); *F16B 2001/0035* (2013.01)

(58) Field of Classification Search
CPC ............... A45F 5/02; A45F 2200/0516; F16B 2001/0035
USPC ...................................................... 224/183
See application file for complete search history.

(56) References Cited

U.S. PATENT DOCUMENTS

| | | | |
|---|---|---|---|
| 5,213,240 A | 5/1993 | Dietz et al. | |
| 5,957,421 A * | 9/1999 | Barbour | A45F 5/02 224/197 |
| 5,992,807 A * | 11/1999 | Tarulli | B60R 11/0241 248/205.3 |
| 6,135,408 A | 10/2000 | Richter | |
| 7,076,885 B2 * | 7/2006 | Potter | G01B 3/1056 224/901 |
| 7,817,002 B2 * | 10/2010 | Fullerton | A45F 5/02 2/312 |
| 8,317,067 B2 * | 11/2012 | Lewis | A45F 5/02 224/183 |
| 8,403,140 B2 | 3/2013 | Woolery | |
| 9,345,433 B1 * | 5/2016 | Shinozuka | A61B 5/1115 |
| 9,397,719 B1 * | 7/2016 | Schmidt | F16M 11/24 |

(Continued)

*Primary Examiner* — Justin M Larson

(57) ABSTRACT

The apparatus disclosed is an assembly of two main components entitled a main plunger and a head plunger, combined with other associated components that work in conjunction with the two plungers. The main plunger and head plunger each have a radial gear component, designed such that both radial gear components can interface and mesh with each other or with a corresponding radial gear integral to a custom case. In this manner, meshing of the radial gears provides secure attachment and locking of a carried item. Both plungers also contain internal disc magnets which are so arranged in their polarity as to accentuate the magnetic attraction between the plungers. The head plunger is affixed to a planar deck which facilitates the attachment of items such as cell phone cases. When an attachment of this nature is made, a mechanical key, key pin, and other components make the attachment feasible.

20 Claims, 16 Drawing Sheets

PB for MP
Top view

Carrying cellphone on torso (side)

FIG 31

(56) References Cited

U.S. PATENT DOCUMENTS

| | | | | |
|---|---|---|---|---|
| 9,657,895 B2* | 5/2017 | Chen | ............. | F16M 13/022 |
| 9,706,829 B2* | 7/2017 | Tilney | ............. | A45F 5/00 |
| 9,800,283 B2* | 10/2017 | Schmidt | ............. | H04B 1/3877 |
| 9,847,805 B2* | 12/2017 | Sirichai | ............. | A45C 11/00 |
| 9,973,013 B2* | 5/2018 | Yan | ............. | H02J 7/0027 |
| 10,078,346 B2* | 9/2018 | Lay | ............. | G06F 1/1616 |
| 10,100,971 B2* | 10/2018 | Yun | ............. | B60R 11/0241 |
| 10,173,292 B2* | 1/2019 | Fullerton | ............. | B23P 15/001 |
| 2003/0014844 A1* | 1/2003 | Splane, Jr. | ............. | A45F 5/02 24/3.1 |
| 2008/0023508 A1* | 1/2008 | Harchol | ............. | A45F 5/02 224/183 |
| 2009/0289090 A1* | 11/2009 | Fullerton | ............. | A45F 5/02 224/183 |
| 2013/0299533 A1 | 11/2013 | Gronewoller et al. | | |
| 2013/0303000 A1* | 11/2013 | Witter | ............. | H01R 13/6205 439/39 |
| 2014/0354218 A1* | 12/2014 | Kaynar | ............. | H02J 7/0044 320/107 |
| 2014/0355200 A1* | 12/2014 | Thiers | ............. | H04W 88/02 361/679.41 |
| 2016/0040825 A1* | 2/2016 | Franklin | ............. | F16M 13/02 439/39 |
| 2016/0254083 A1* | 9/2016 | Bennett | ............. | F41C 33/0209 335/285 |
| 2016/0373152 A1* | 12/2016 | Schmidt | ............. | H04B 1/3877 |
| 2017/0234340 A1* | 8/2017 | Pensak | ............. | A41F 1/002 24/3.1 |
| 2018/0049493 A1* | 2/2018 | Graves | ............. | A41D 27/20 |
| 2018/0064235 A1* | 3/2018 | Alexander | ............. | A45C 13/1069 |
| 2018/0325249 A1* | 11/2018 | Vlassis | ............. | A45F 5/022 |

* cited by examiner

MPT without PB
Top view

MPT without PB
Bottom view

PB for MP
Top view

PB for MP
Bottom view

Magnets
Top and bottom views

Magnetic shield
Top and bottom views

MP and PB assembly
Top view

MP and PB assembly.
Side view

Foam ring

Gear pin
Top view

Gear pin
Bottom view

Gear pin slots
Side view

Floater
Top view

Floater
Bottom view

Case
Top view

Case
Bottom view

Key and Washer
Top view

Key and Washer
Bottom view

Key Pin
Side view

Floater
magnetic
shield

MPT with Key and
Key Pin assembly
Bottom view

Case with Key Pin, Key
and Gear Pin assembly
Top view

Case with Floater and PB
for MP assemblage
Bottom view

Head top
Top view

Head top
Bottom view

PB for Head top
Top view

Head with PB

180

22

163

190

Foam Wedge
Back support for
Head

Head assembly
with foam Wedge

Head assembly
with straps

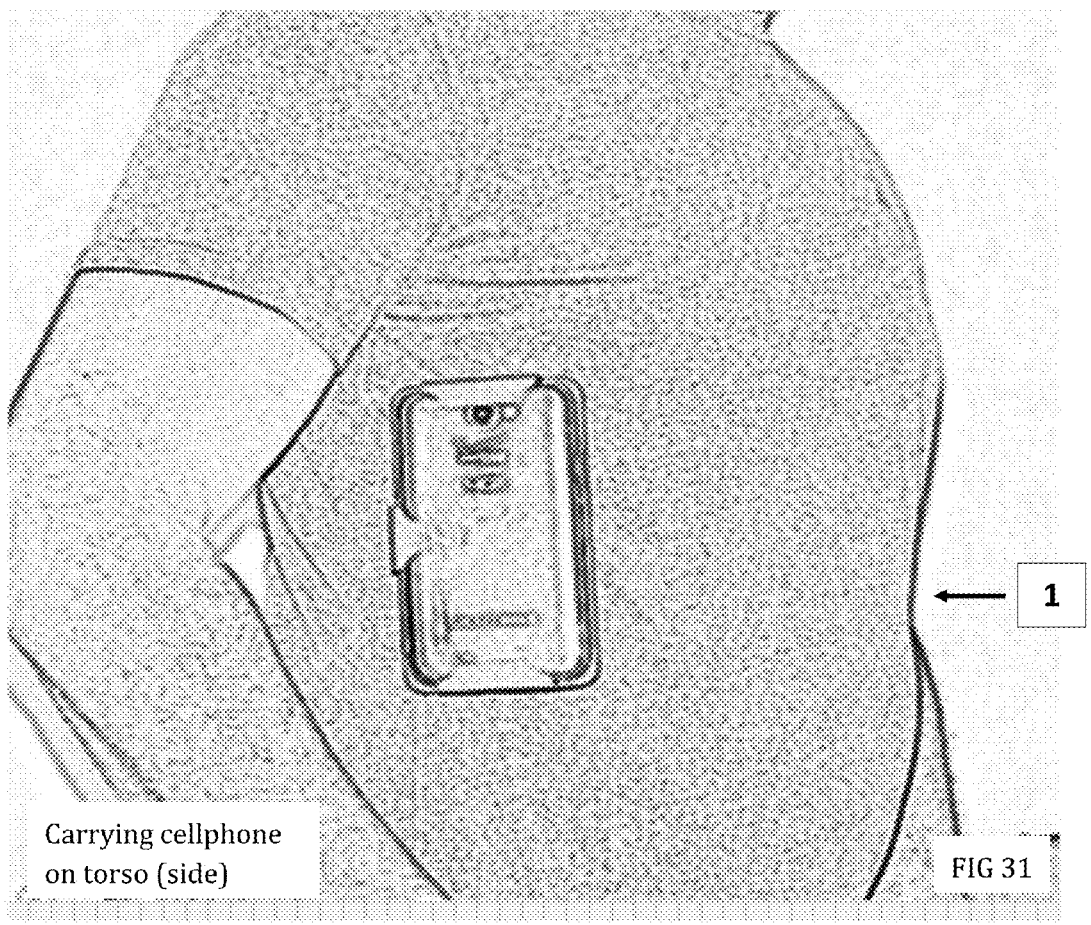
FIG 31 Carrying cellphone on torso (side)

METHOD AND APPARATUS FOR SUPPORTING AND TRANSPORTING PERSONAL PORTABLE DEVICES USING MAGNETS

CROSS REFERENCE TO RELATED APPLICATIONS

This application claims the benefit and priority of provisional patent application No. 62/380,123 filed on Aug. 26, 2016, which provisional application is incorporated herein by reference.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable

BACKGROUND OF THE INVENTION

(1) Field of the Inventive Concept

With the advent of smart phones, these types of personal devices have developed into much more than just a cell phone. This has resulted in a consumer demand for personal devices that are larger in size and capacity than the devices sold in the early 2000's, and always close at hand. In particular, smart phones sold after 2010 are of such physical size that they often prove difficult to carry on a person's belt or waistline without interfering with their comfort and productivity. It frequently occurs that more of these devices are left lying around where they get stolen, misplaced or damaged during transportation. Additionally, an increasing number of users find themselves having to carry two of these devices at the same time, further exasperating the problem.

The disclosed inventive concept is intended to address this problem in the short and long term as the size of the phone display screen is expected to remain greater than 4 inches. This invention is not intended to be limited to the support and transportation of smart phones but also to transport any other device or system that meets the size and weight limitations of the apparatus disclosed.

(2) Description of the Related Art, Including Information Disclosed Under 37 CFR 1.97 and 1.98

U.S. Pat. No. 5,957,421 (Sep. 28, 1999 A retainer device (10) for holding tools (12) in a removable manner to a utility belt (14) and a wall (16) comprising a plurality of clip members (18). A facility (20) is for mounting the clip members (18) to the utility belt (14) and the wall (16). A plurality of stud members (22) are provided. An assemblage (24) is for affixing each of the stud members (22) to a tool (12). In a first instance, each tool (12) with one stud member (22) can quickly engage with and disengage from any one clip member (18) on the utility belt (14) for work purposes. In a second instance, each tool (12) with one stud member (22) can quickly engage with and disengage from any one clip member (18) on the wall (16) for storage purposes.

U.S. Pat. No. 5,213,240 (May 25, 1993) An improved magnetic tool holder for tape measures is provided in which a spoked keeper plate is mounted on the tool to be held in the tool holder. This results in a uniform holding force around the circumference of the holder so that the tool can be securely held in the receptacle and can be readily and easily removed by application of a controlled force. The holding force can be varied by varying the number of spokes and the width of the spokes. A self-centering ring and receptacle is provided to produce an audible click when the tool is properly seated with the keeper plate in intimate contact with the magnet and pole piece.

U.S. Pat. No. 5,992,807 (Nov. 30, 1999) A cell phone is removably attached to the dashboard of a vehicle by means of a magnet. The magnet is permanently secured to the dashboard. The cell phone is removably retained by the magnet (due to the attraction between the magnet and the metal parts normally found in the cell phone) and the cell phone may be lifted off manually and manually replaced on the magnet. The magnet has a front face provided with a rubber layer. This rubber layer provides a frictional resistance which is supplementary to the magnet and prevents the cell phone from slipping down.

U.S. Pat. No. 6,135,408 (Oct. 24, 2000) In a holder for an object, such as a mobile telephone, comprising a housing having a front part with a front wall and a rear part with a rear wall and a permanent magnet disposed in the housing adjacent the front wall thereof, the front wall has a recess formed therein and an iron plate having a shape so as to be fittingly received in the recess and having adhesive means at one side thereof is provided for attachment of the plate to an object to permit placing of the object on the holder with the iron plate mounted thereon and received in the recess for locating and holding the object on the holder.

U.S. Pat. No. 8,403,140 (Mar. 26, 2013) An apparatus to display a tool holder that incorporates magnets comprises at least a magnetically attractable work item, a tool holder incorporating magnets and an attachment mechanism for attaching the magnetically attractable work item to the display. The attachment mechanism attaches to the magnetic tool holder such that the magnetically attractable work item is able to be removed from the magnet of the tool holder while still coupled to the magnetic tool display. In some embodiments, the apparatus also comprises a display placard. In these embodiments, the attachment mechanism attaches to the display placard and the magnetically attractable work item such that the magnetically attractable work item is able to be removed from the magnet of the tool holder while still coupled to the display placard.

U.S. Pat. No. 7,076,885 (Jul. 18, 2006) A tool and tool holder with a permanent magnet mounted upon one and a magnetically permeable keeper on the other are provided with respective camming surfaces which are cooperatively engaged when the tool is rotated, breaking the magnetic attraction between opposing surfaces of the magnet and keeper to facilitate removal of the tool from the holder. A cup-like receptacle is mounted upon a body portion of the tool, disclosed in each of two embodiments as a flexible, metal measuring tape contained within a hollow housing, and one of the magnet and keeper is disposed within this receptacle. The camming surface on the tool comprises convex protrusions within the receptacle in a first embodiment, and protrusions extending outwardly from the periphery of the receptacle in a second embodiment. A recess is formed in a surface of the holder to receive the receptacle on the tool when the latter is releasably mounted upon the holder. The other of the magnet and keeper, as well as the camming surface on the holder, is disposed within the recess. A receiver and indicator may be attached to or integrally formed in the tool, to be activated by a signal from a transmitter, which may be attached to or integrally formed in the holder. When activated, the indicator provides a visible or audible indication to aid in locating the tool when it is separated from the holder. Belt loops and a pencil holder may be integrally formed with the holder body portion.

BRIEF SUMMARY OF THE INVENTION

The present inventive concept provides a method and apparatus of supporting and transporting portable devices suspended from various body parts using a set of strategically placed magnets and supporting hardware. The apparatus culminates in an assembly entitled a "Button Magnet" 1 which is designed to be affixed to various positions on certain parts of a person's anatomy, such as the torso, legs, and arms.

This allows a user of the assembly 1 to select a multitude of locations for carriage of a portable electronic device or other object. This capability ensures added convenience, efficiency, safety and mobility. The exemplary positions shown in this disclosure, however, are optional as other locations on the human body, or even clothing worn by a user, may be utilized.

The Button Magnet 1 is an assembly of two main components entitled a main plunger (MP) 50 and a head 180, combined with other associated components to be described. The MPT 10 and the case 100 each have a radial gear designed such that both radial gears 81 and 83 respectively, can interface and mesh with each other when the MPT 10 and the case 100 are interconnected to provide secure attachment and locking of an item being carried.

When an attachment of this nature is made, a mechanical key 110, key pin 120, and other components make the attachment feasible.

Both the main plunger 50 and the head 180 contain internal disc magnets 21, 29 which are so arranged in their polarity as to accentuate the magnetic attraction between the main plunger 50 and the head 180.

The head 180 is shown, affixed to a planar deck 162 which facilitates attaching the head 180 to an undergarment 218, using straps 211, 112, also attached to the undergarment, or various types of garments or body parts such as the torso, legs and arms.

BRIEF DESCRIPTION OF THE VIEWS OF DRAWINGS AS EXEMPLARY EMBODIMENTS OF THE INVENTIVE CONCEPT

Figure 16:
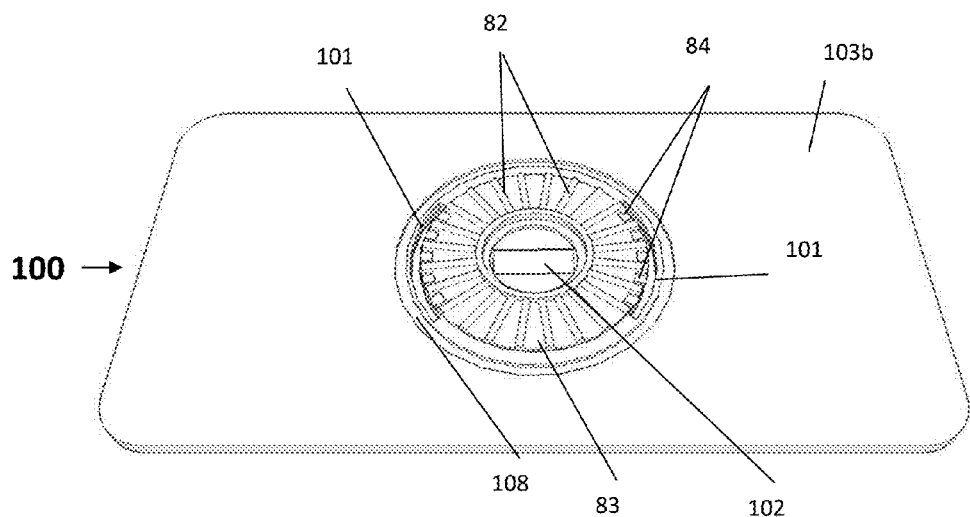

FIG. 16 presents the bottom view of the case 100.

Figure 17:
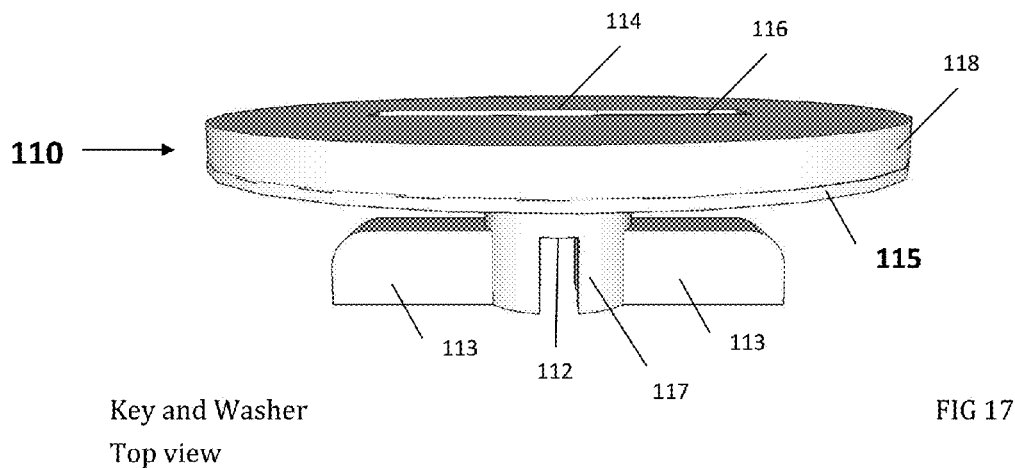

FIG. 17 illustrates a side view of the components, entitled a key 110 and the washer 115.

Figure 18:
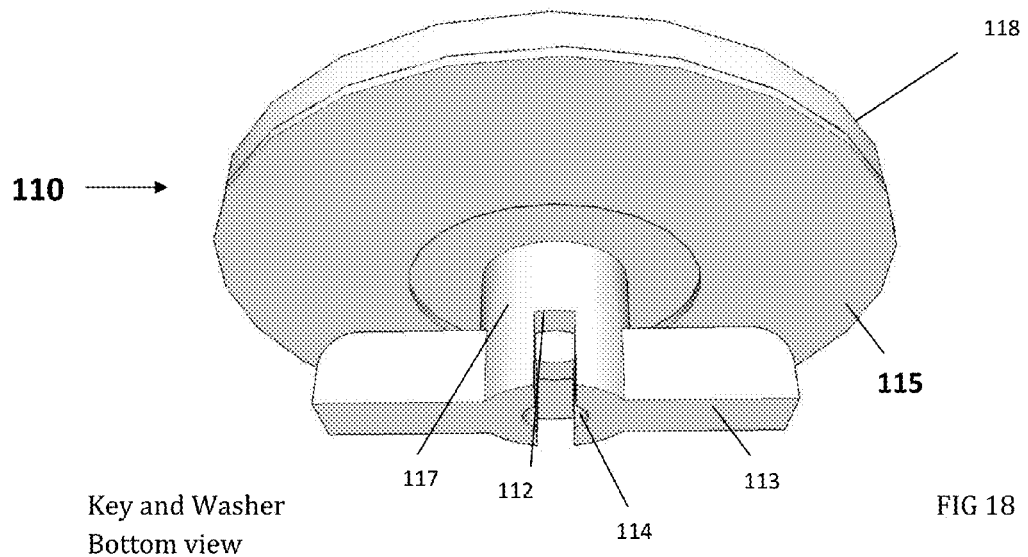

FIG. 18 shows the bottom view of the key 110 and the washer 115.

Figure 19:
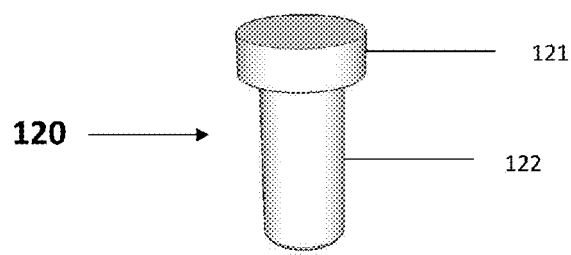

FIG. 19 shows a perspective view of a component, entitled a key pin 120.

Figure 20:
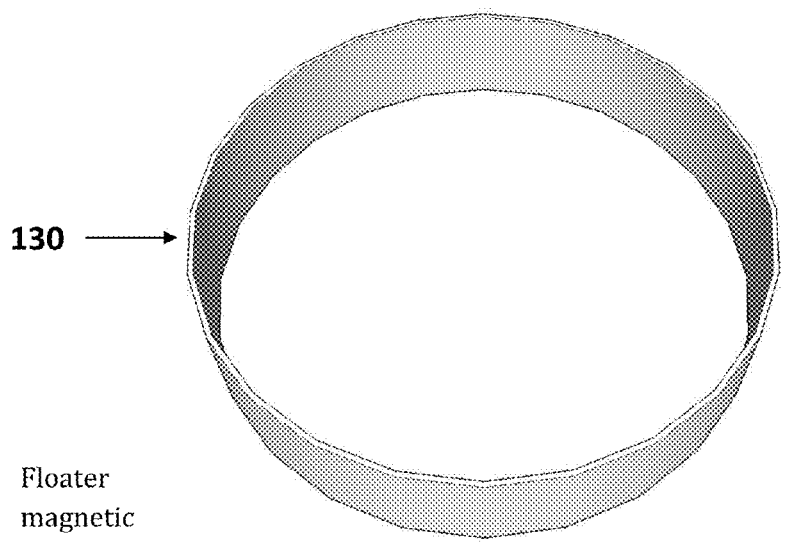

FIG. 20 shows the magnetic shielding 130, used in the floater, in ring form

Figure 21:
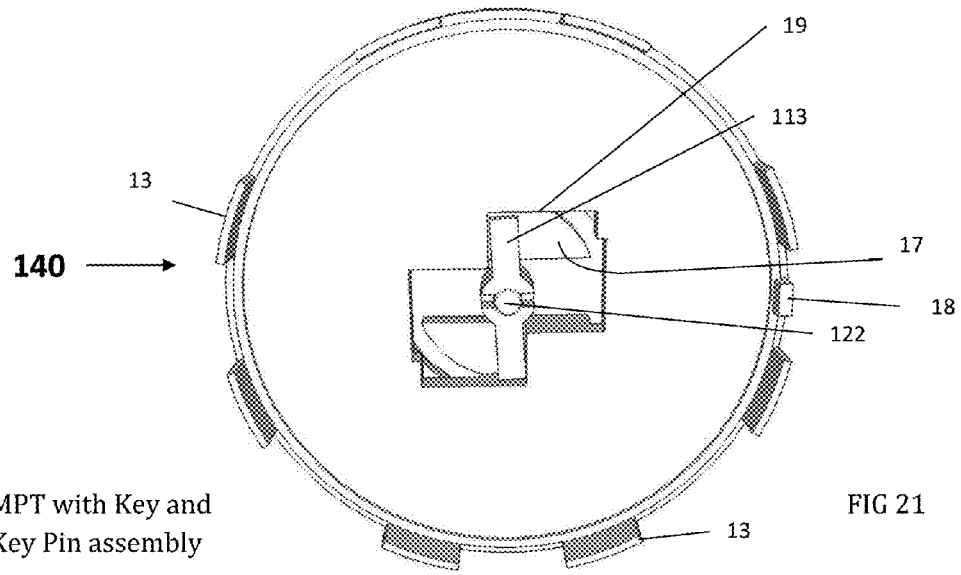

FIG. 21 shows the bottom view of the MPT with key and key pin assembled 140

Figure 22:
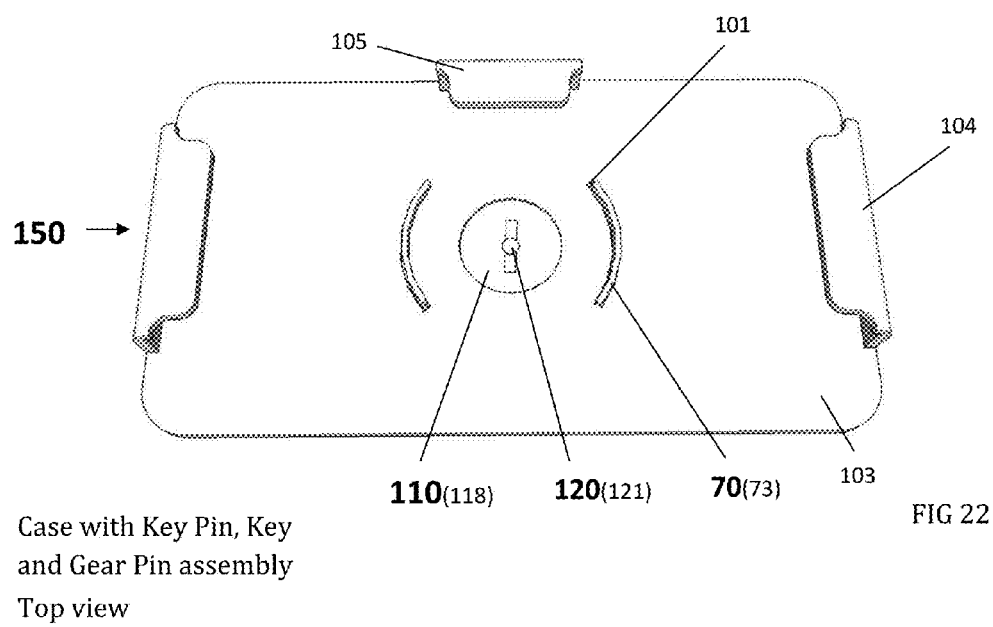

FIG. 22 shows the inner view of a case with an assemblage of the key pin 110, key 120, and gear pin 70.

Figure 23:
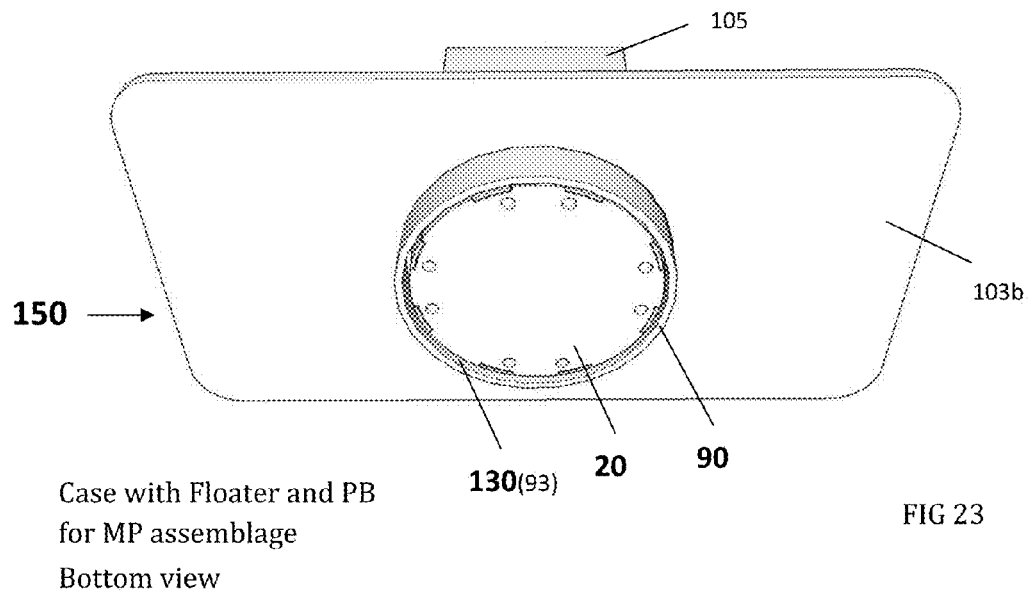

FIG. 23 shows the bottom view of the top portion of the illustrations in FIG. 22.

Figure 24:
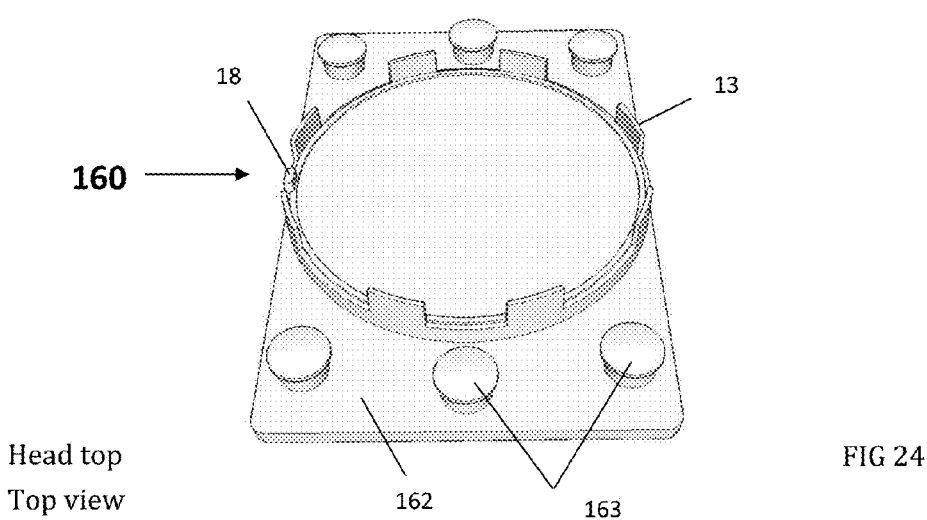

FIG. 24 is a top view of a component, entitled the head top (HT) 160, including a customized planar deck 162.

Figure 25:
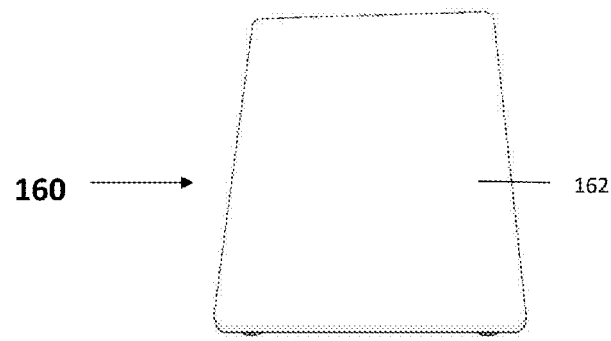

FIG. 25 is a bottom view of the planar deck 162 that is attached to the head top (HT) 160.

Figure 26:
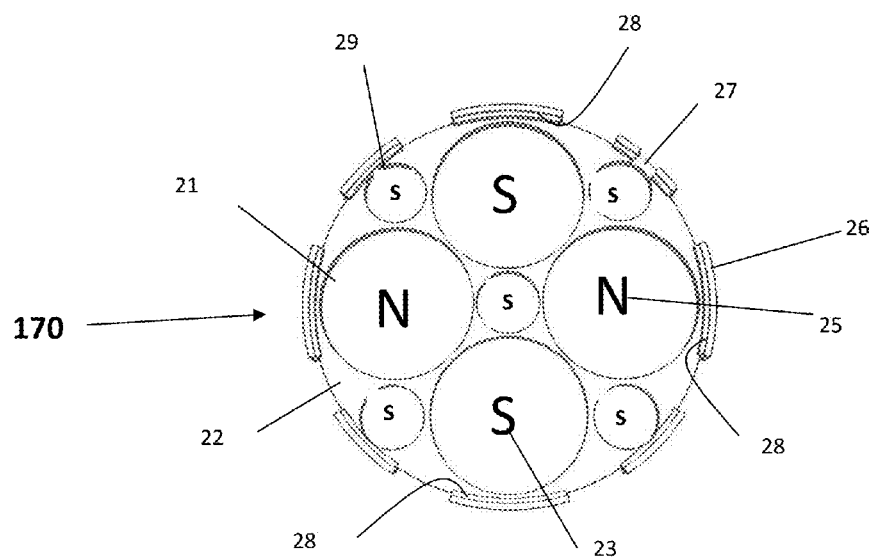

FIG. 26 illustrates the top view of the plunger bottom (PB) 170 that is used only with the head top 160

Figure 27:
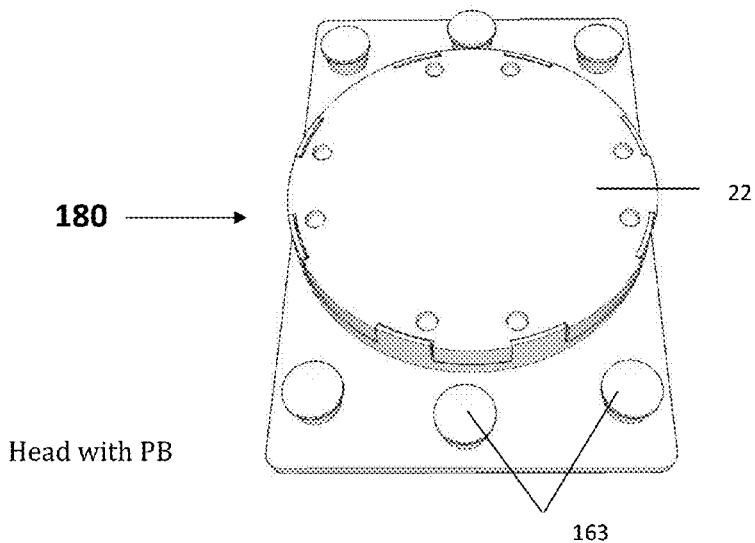

FIG. 27 is a top view of the head 180 with plunger bottom 170 assembled

Figure 28:
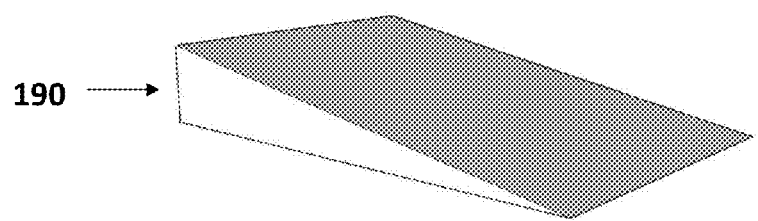

FIG. 28 is a component entitled the foam wedge 190.

Figure 29:
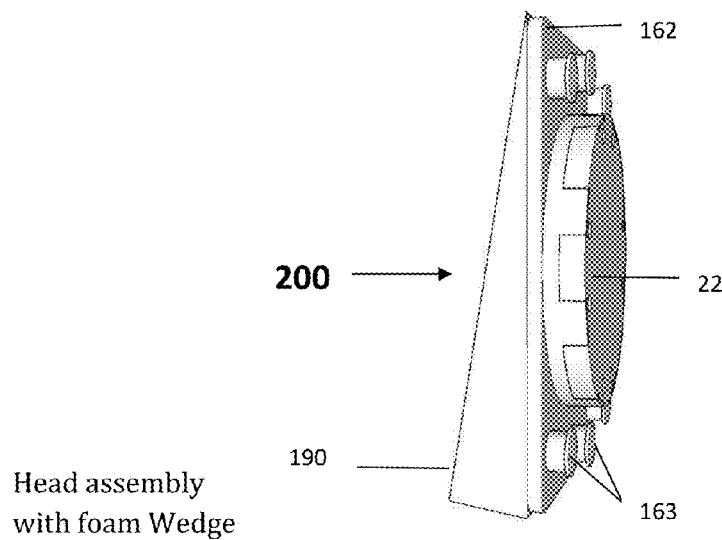

FIG. 29 illustrates the side view of an assembly 200 comprising the wedge 190 and the assembled head 180.

Figure 30:
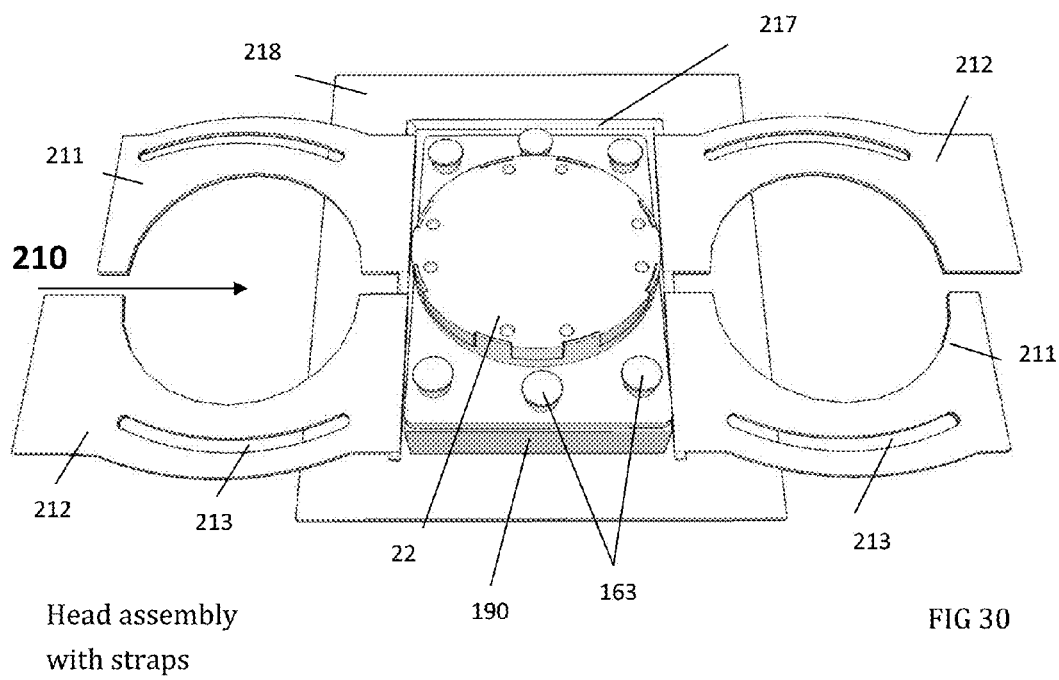

FIG. 30 shows the top view of the assembly 210, combined with straps and other components for facilitating attachment to a garment.

FIG. 31 illustrates a cellphone in its case being attached to a garment, using the Magnet Button 1.

DETAILED DESCRIPTION OF THE INVENTION

The objects, features, and advantages of the inventive concept presented in this application are more readily understood when referring to the accompanying drawings. The drawings, totaling thirty-one figures, show the basic components and functions of embodiments and/or methods of use. In the several figures, like reference numbers are used in each figure to correspond to the same component as may be depicted in other figures.

Figure 1:
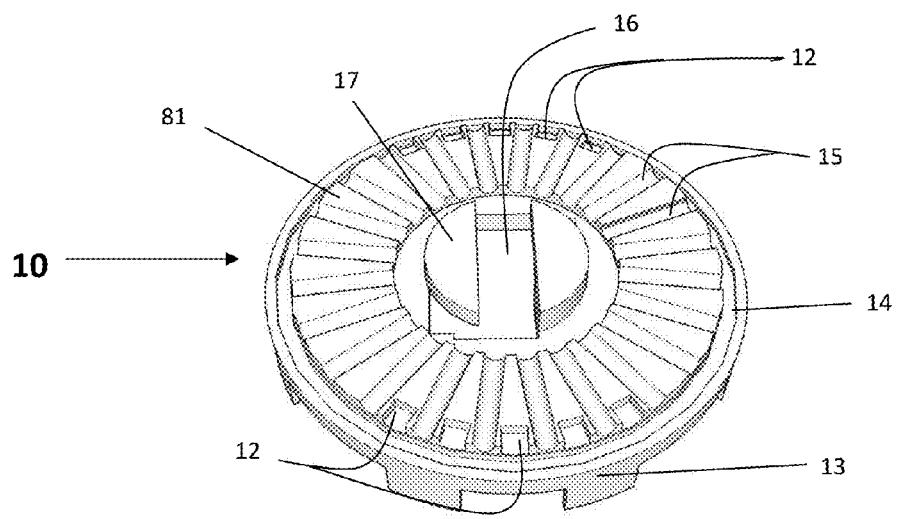
FIG. 1 illustrates a top view of the main plunger, referred to as MPT 10.
Figure 2:
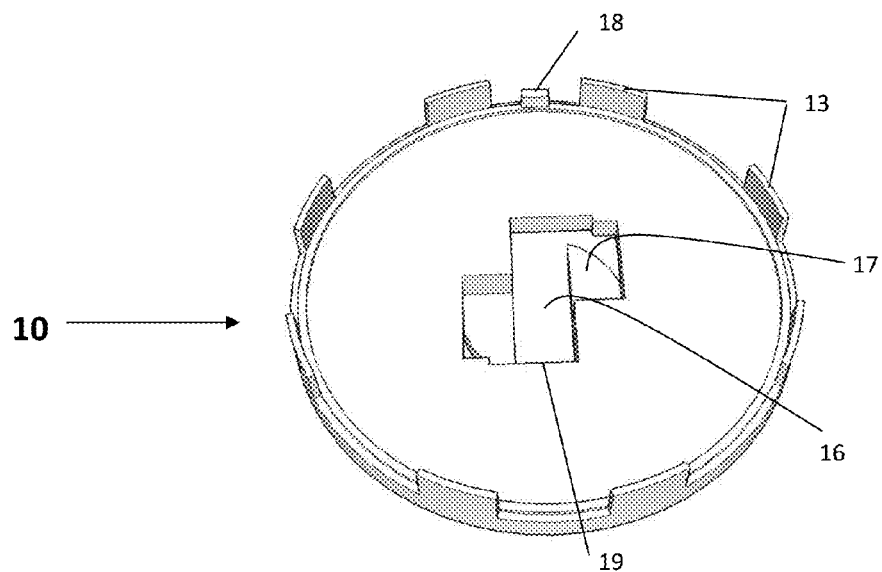
FIG. 2 depicts the bottom view of the MPT 10.

The discussion of the present inventive concept which, in its final assembled state, is referred to as a "Button Magnet 1," will begin with FIG. 31. The Button Magnet 1 is an assembly of a main plunger (MP) 50 and a head 180, combined with other associated components to be described. Depicted in FIG. 1 is a top view of a component referred to as a main plunger top 10, or for the sake of convenience, the "MPT" 10. FIG. 2 presents a bottom view of the NWT 10.

The MPT 10 essentially comprises a radial gear 81 with a plurality of female gear teeth 15. The gear teeth 15 are designed to interface and mesh with a set of radial male gear teeth 82 that are attached, in one embodiment, to a cellphone case 100 (illustrated in FIG. 16). The MPT 10 is also manufactured to interface with a component referred to as a plunger bottom, or "PB" 20, which will be described below in this document. Further shown in FIG. 1, and also in FIG.

2, is a symmetrical arrangement of protruding tabs 13. The tabs 13 are used only to latch the MPT 10 onto the PB 20 during field trials of the Button Magnet 1. The tabs 13 are not needed in the final production version, as a combination of the MPT 10 and PB 20 will be hermetically sealed during the production process.

FIG. 1 illustrates that the MPT 10 has a circular channel 14 which serves as a housing for a foam ring 60 (not shown). Further shown are two opposing sets of five gear pin slots 12. The gear pin slots 12 function to accept insertion of two sets of five corresponding gear pin teeth 71, which are components of a gear pin 70 (shown in FIG. 10) as will be described later in this document. Also shown is a major slot 16 which functions to accept insertion of a controlling key 110 (shown in FIG. 17) which facilitates locking of the case 100 to MPT 10. A two-part, crescent-shaped overhang 17 serves to form a solid latching retention of the stems 113 of the key 110.

FIG. 2, as earlier stated, shows a bottom view of the MPT 10. In FIG. 2, visible are the tabs 13, the overhang 17, and the major slot 16. An opening 19 serves only to facilitate manufacturing the MPT 10. Also shown in FIG. 2 is a square pike 18 which is used as an indicator when aligning the MPT 10 to the PB 20.

Figure 3:
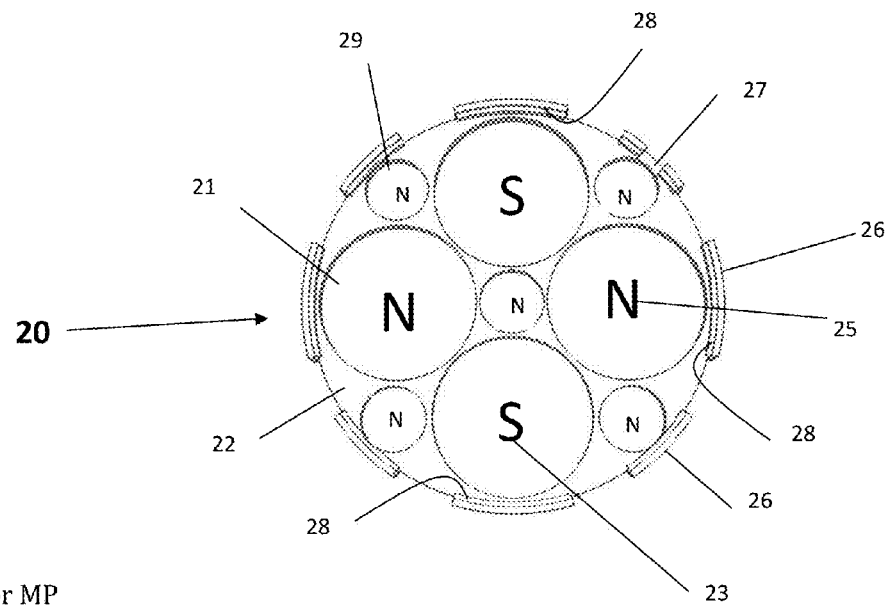
FIG. 3 illustrates the top view of a component referred to as the plunger bottom PB 20 which is used only with the MPT 10.

FIG. 3 presents a top view of PB 20. The MPB 20 houses a symmetrical array of large disc magnets 21 and small disc magnets 29. The disc magnets 21, 29 are strategically arranged to allow for a gradual and controlled magnetic attractive force when brought into contact with another matching arrangement of magnets, used only with the head top. This plunger bottom (PB) 170, which is identical, in design, to plunger bottom 20 is different, only in the polarity of its array of magnets. Segmented shelves 28 are arranged around the perimeter of the PB 20. The shelves 28 serve to retain a circular magnetic shield 40 (shown in FIG. 6) which is placed over all the disc magnets 21, 29 within the PB 20 and PB 170.

This is to protect any user-carried electronic devices from magnetic field interference. This also serves to simultaneously redirect the concentration of the magnetic field in the direction of the eventually mated PB 170 and the mating PB 20, respectively. The magnetic shield 40 may be stacked since when layered, multiple magnetic shields 40 are more effective. This stacking results in an even stronger magnetic attraction between the PB 20 and the mated PB 170

Again, referring to FIG. 3, the PB 20 is designed as a circular shape to facilitate packing a denser array of disc magnets 21, 29 into a smaller space, hence the different magnet sizes 21, 29 utilized. The top view of PB 20 in FIG. 3 shows an arrangement of four large magnets 21 and five small magnets 29, all nine magnets 21, 29 arranged symmetrically upon a circular base 22. A notch 27 is placed on the PB 20 corresponding to the dimensions of a square spike 18 fabricated onto the side perimeter of the MPT 10. The notch 27 and spike 18 are used to guide the combined assembly of the MPT 10 and PB 20. This combined assembly forms the main plunger (MP) 50. The ledges 26 are used to support the shelves 28.

Figure 4:
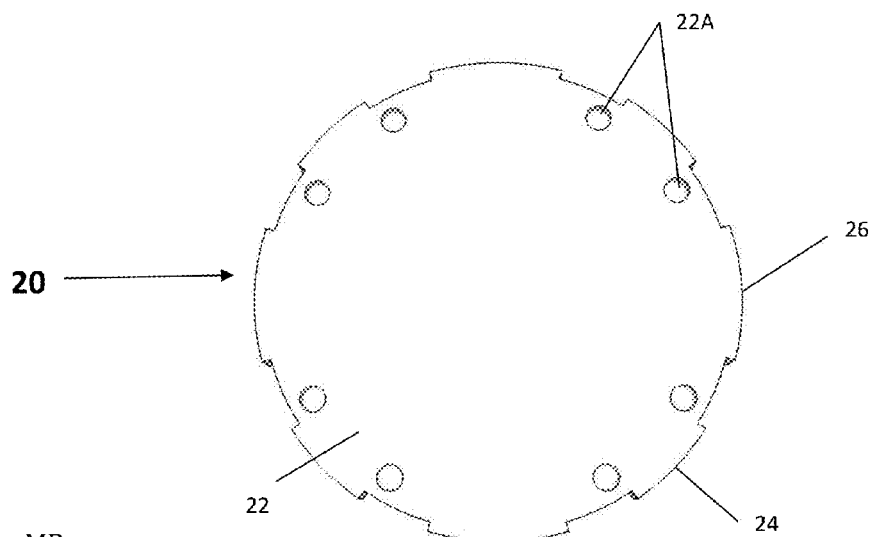
FIG. 4 shows the bottom view of the PB 20.

FIG. 4 presents the bottom view of the PB 20, showing its circular base 22 and a series of ledges 26. Similar to the tabs 13 on the MPT 10, the ledges 26, are used to securely hold the PB 20 to the MPT 10 during field trials. There are small circular indentations 22A on the bottom of the base 22 of PB 20, and also on the identical PB 170. These indentations 22A serve to make the Button Magnet 1 lighter weight by removing any and all excess material.

The circular base 22 of the PB 20 can also be a square or other geometric shape with the insertion of magnets of varying shapes and sizes. The most important prerequisite is that any array of magnets is made operational by alternating the north polarity 25 and south polarity 23 of the large magnets 21, as shown in FIG. 3. The alternating polarity provides functionality such that when the PB 20 and the PB 170 are brought in close proximity, but 90 degrees magnetically out of phase with each other, the repulsion of the more powerful large magnet 21 poles will slow the rate of attraction. This makes it safer for a user to gradually bring the mating PB 20 magnetically in phase with its mated PB 170. To separate the PB 20 and the mated PB 170, a user just do the reverse by rotating the PB 20 ninety degrees out of phase with PB 170.

The small magnets 29 of the PB 20 will always remain in opposing magnetic polarity to the small magnets of the mated PB 170 so that the small magnets 29 help to counteract some of the initial repulsion from the large magnets 21. The small magnets 29 will conversely, supplement the holding force of the large magnets 21, once they are all magnetically aligned. The polarity relationships are essential to facilitate the latching (locking) and unlatching (unlocking) of the PB 20, attached to the MPT 10, and the PB 170 attached to the head top 160. This method of latching and unlatching is pivotal to the safe and secure operation of the Button Magnet 1.

Referring again to FIG. 3, it is to be noted that all the disc magnets 21, 29 used are axially magnetized, with their north pole (N) 25, being on one face of each magnet and their south pole (S) 23, on the opposite face.

Figure 5:
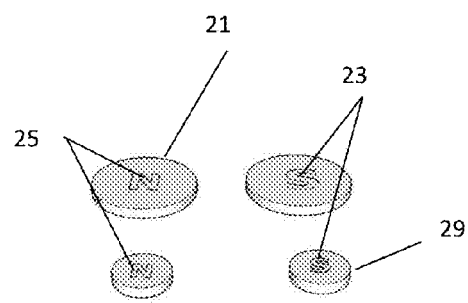
FIG. 5 shows top and bottom views of large 21 and small 29 disc magnets.

FIG. 5 illustrates the general shape and contour of opposite sides of both the large disc magnets 21 and the small disc magnets 29. Also shown is their respective north polarity 25, and south polarity 23.

Figure 6:
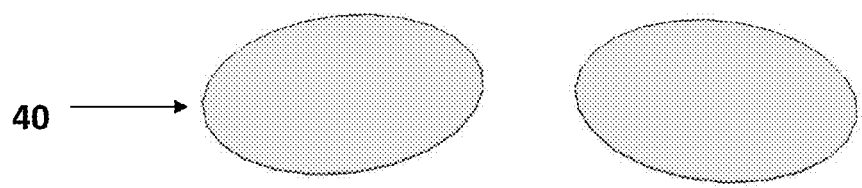
FIG. 6 shows the magnetic shielding 40 used in the PB for the MPT 10 and the head top (HT) 160.

FIG. 6 shows the two sides of the disc-shaped magnetic shields 40. The material used in the magnetic shield 40 may be selected from the group of metals comprising metallic alloys.

Figure 7:
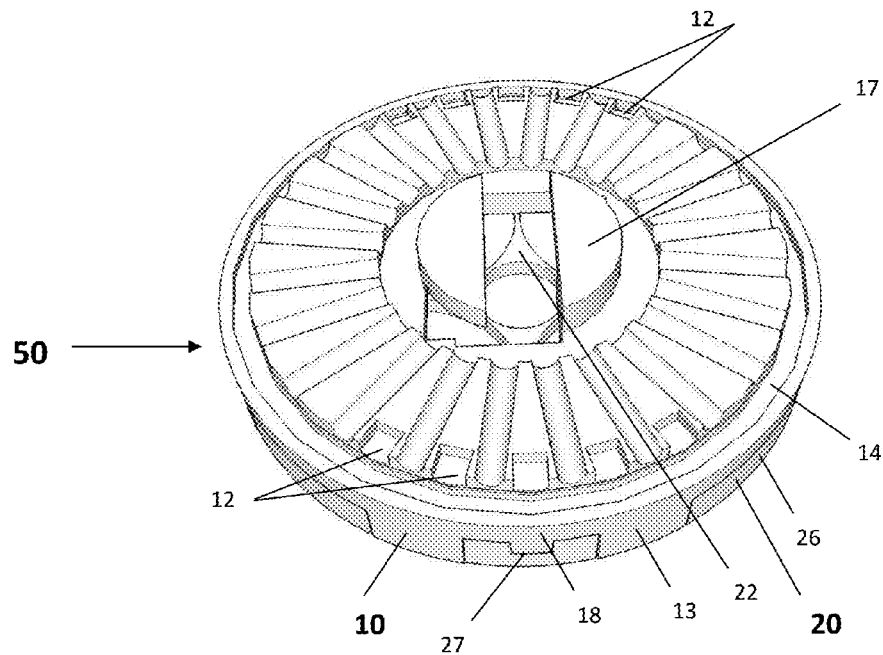
FIG. 7 illustrates the top view of the MPT 10 and PB 20 assembled, without the magnets 21, 29 and the magnetic shield 40 to form the MP 50
Figure 8:
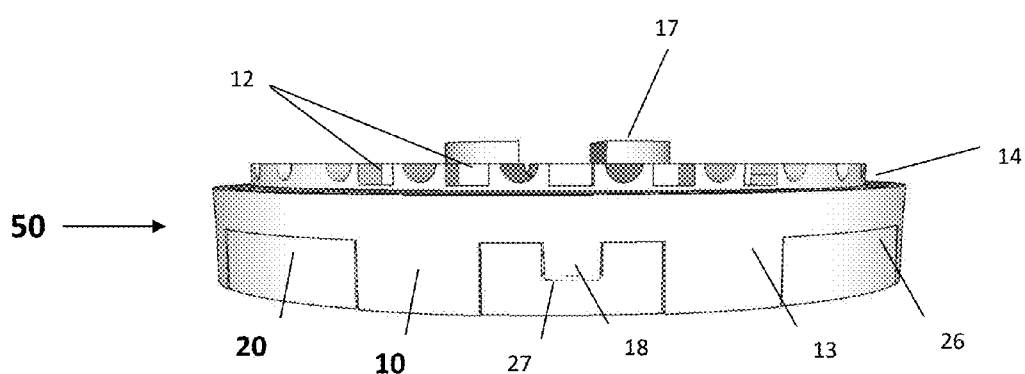
FIG. 8 shows the side view of the main plunger (MP) 50.

FIG. 7 depicts a top view of the assembled main plunger 50 which comprises the combination of the MPT 10 and the PB 20, with the magnets 21,29 and the magnetic shield 40 not shown. The circular base 22 of the PB 20 is shown FIG. 8 illustrates a side view of the main plunger assembly 50. Assembly of the MP 50 is performed after the installation of the magnets 21, 29 and magnetic shields 40. FIG. 7 and FIG. 8 further shows the interlocking relationship of the tabs 13 of the MPT 10 and the ledges 26 of the PB 20. Also illustrated is the matching of the square spike 18 of the MPT 10 and the notch 27 of the PB 20.

The two semi-circular overhangs 17, circumferential channel 14, and the gear pin slots 12 are also shown in FIG. 7 and FIG. 8.

Figure 9:
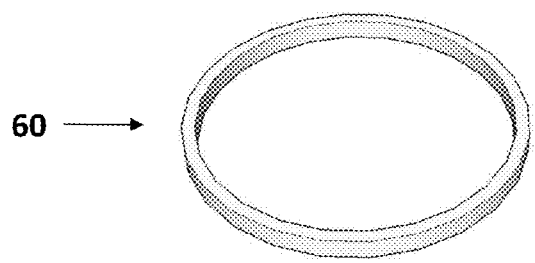
FIG. 9 illustrates an isometric view of a component entitled a foam ring 60.

FIG. 9 shows the foam ring 60, which is fitted into the channel 14 of the MPT 10 during assembly of the main plunger 50. The foam ring 60 is of resilient material and acts as a spring beneath a gear pin 70, which gear pin 70 is shown in FIG. 10.

Figure 10:
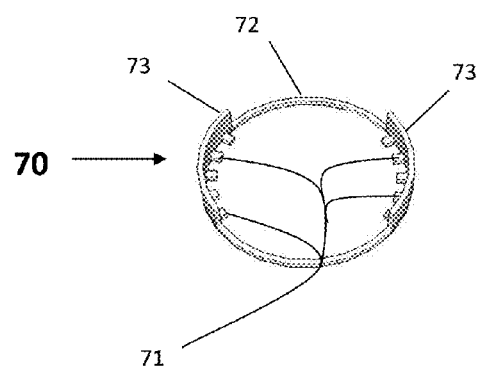
FIG. 10 is a top view of a component, entitled gear pin 70.

FIG. 10 is a perspective view of the gear pin 70. The gear pin 70 contains a left flange 73 and a right flange 73. Each flange 73 is constructed with a co-located orthogonal set of five gear pin teeth 71.

Figure 11:
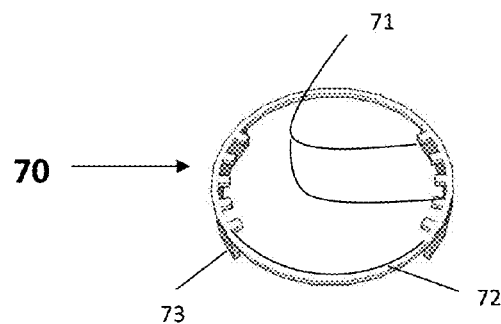
FIG. 11 is a bottom view of the gear pin 70.

FIG. 11 presents a bottom view of the gear pin 70, also showing a continuous connecting ring 72 to which is attached the two sets of gear pin teeth 71 and the left and right flanges 73.

Figure 12:
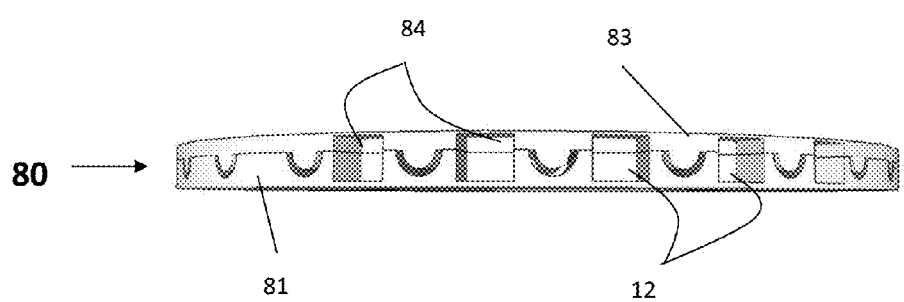
FIG. 12 is a side view of the gears, only to illustrate the slots used for the gear pin 70.

FIG. 12 shows an assembly 80 depicting how the gear teeth 71 would slide up and down in the gear pin slots 84, 12 of the male gear 83 and the female gear 81, respectively, which are both a part of the case 100 and the MPT 10 respectively. The gear pin 70 stops the gears from rotating, relative to each other, only when the case 100 is empty. When the case 100 contains a cellphone or other electronic device, the gear pin 70 is forced away from the base of the case assembly 150 by the device being transported, causing the teeth 71 of the gear pin 70 to only occupy the portion of the gear pin slots 12 on the gear 81 allowing the gears 81, 83 to rotate relative to each other. This provides additional protection from unauthorized "unlocking" of the mating PB 20 and the mated PB 170 by rotating the case 100. Allowing the case 100 to rotate when the device it is transporting is in place, also allows the user some flexibility in the orientation of the case 100 and its contents for convenience or ease of access.

Figure 13:
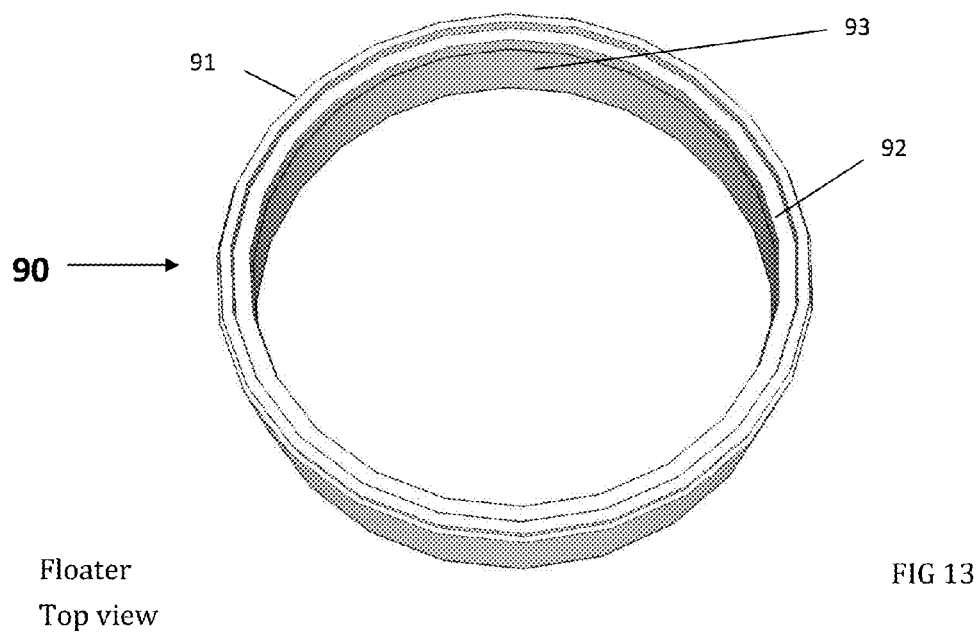
FIG. 13 is a top view of the component entitled a floater 90.
Figure 14:
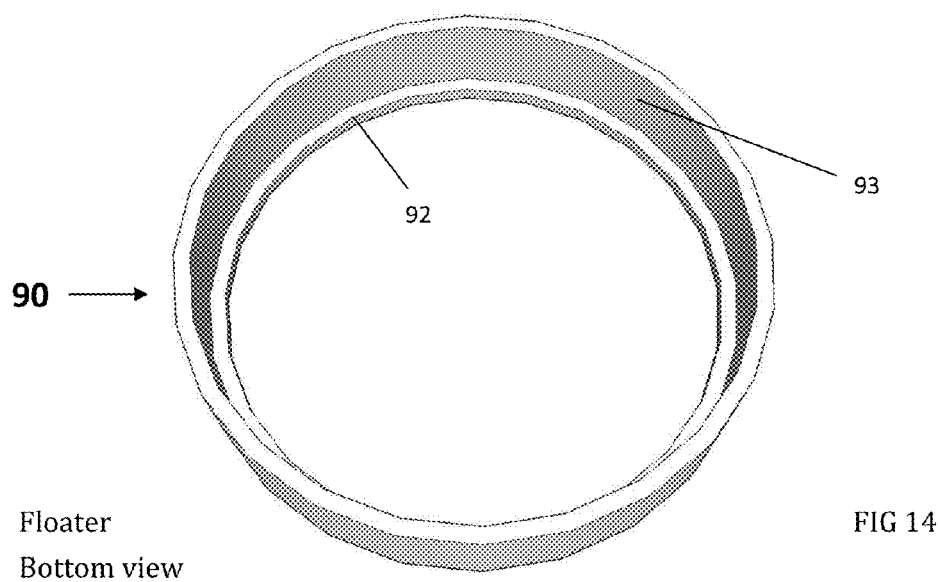
FIG. 14 is a bottom view of the floater 90.

A top view of a component entitled a floater 90 is depicted in FIG. 13, and the bottom view in FIG. 14. The floater 90 comprises a low riser 91, a small lip 92, and an inner wall 93. In one embodiment, the floater 90 is utilized in a case assembly 150 (Ref. FIG. 23) so as to extend below the edge of the mating PB 20. This positioning of the floater 90 further prevents any unauthorized "unlocking" of the button magnet 1 by sliding the mating PB 20 (applying lateral force) relative to its mated PB 170 instead of turning the mating PB 20. The floater 90 can also provide additional magnetic shielding 130 affixed to its inner wall 93.

This allows the inner wall 93 of the floater 90, with the magnetic shield 130 installed, to also serve as an induced magnet to pull the floater 90 away from the base of the case assembly 150 when both the MP 50 and the head 180 are magnetically aligned. The floater 90 is held in place by the small lip 92 that comes to rest on the MPT 10 (not shown).

The low riser 91 on the floater 90 also serves as a cover to hide and protect the operation of the gear pin 70. The low riser 91 can, at times, extend into a recess channel 108 (refer to FIG. 16) which is scored into the undersurface 103(b) of the bed 103 of the case 100 (ref FIG. 23). Depending on the position of the floater 90 at any point in time, it is allowed to move freely, but only in a plane parallel to the MP undersurface. The movement is not allowed when the Gear Pin 70 is lowered and resting against the lip 92 of the floater 90, further assisting to push the floater 90 away from the base of the case assembly 150.

Figure 15:
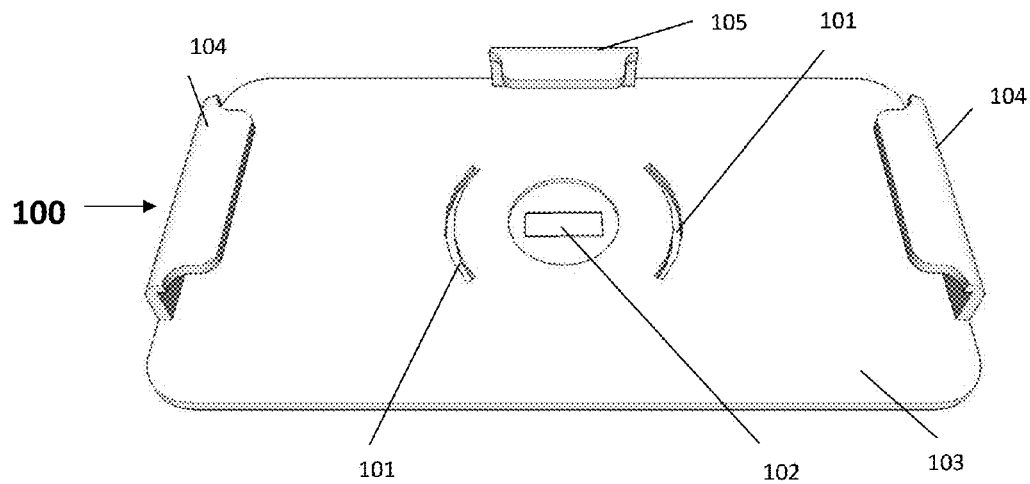
FIG. 15 illustrates the top view of component, entitled a case 100.

FIG. 15 depicts a view of the inner surface of a case 100. In the preferred embodiment, and for illustrative purposes only, the case 100 shown in FIG. 15 is a cellphone case. However, in other embodiments, the case 100 may also exist as a similar structure for carrying any type of electronic device, including a tablet, smart phone, calculator, or other non-electronic device. In the embodiment shown in FIG. 15, the case 100 is constructed with two open crescents 101. Also shown in FIG. 15 are the bed 103, left and right large clips 104, a small clip 105 at mid-length of the case 100, and a key slot 102. The key slot 102 is dimensioned so as to allow insertion of the key 110. The clips 104, 105 provide securement of the cellphone or other carried object.

The crescents 101 are specifically built to allow an adjustable insertion of the flanges 73 of the previously-described gear pin 70. In this manner, the flanges 73 of the gear pin 70 may be inserted to protrude above or level with the bed 103 of the case 100. This insertion allows the gear pin 70 to perform like a lever that allows the case 100 to rotate, parallel to, and relative to the surface of the MPT 10 when the flanges 73 are inserted at their lowest point above the bed 103. When the flanges 73 are pushed further into the case to their highest elevation above the bed 103, the case 100 cannot rotate, relative to the MPT 10.

FIG. 16 shows the undersurface 103(b) of the case bed 103 and also depicts a radial gear 83 with a plurality of male gear teeth 82, which facilitates mating with the radial gear associated with MPT 10. Also located in the center of the case 100 is a key slot 102, accommodating insertion of the key 110 (shown in FIG. 17 and FIG. 18) to lock the case 100 to the MPT 10. At the base, or underside 103(b) of the case 100, as shown in FIG. 16, the circular recess channel 108 is visible. The recess channel 108 accommodates the low riser 91 of the floater 90 to extend as needed.

FIG. 17 shows a view of the key 110, which is constructed with a round table top 118 containing a shallow channel 116 and the opening to a cylindrically-contoured hole 114 which runs co-axially with the length of a shank 117. The shank 117 also houses a rectangular crevice 112 which extends for approximately one-half the length of the shank 117, as shown in FIG. 18. The key 110 controls the amount of torque that is required to rotate the case 100 by sliding the key stems 113 of the key 110, along the sloped faces of the overhangs 17. The washer 115 which follows the contour of the table top 118 is used to maintain the tension (torque) set by the key 110 that is needed to rotate the case 100 relative to the MPT 10.

FIG. 18 depicts an upward-looking view of the bottom of the key 110 and washer 115. The shank 117 is also shown to support two linearly-aligned stems 113. The two stems 113 operate as an interface with the overhangs 17 of the MPT 10. In the preferred embodiment, the stems 113 engage the overhangs 17 so as to prevent separation of the case 100 from the MPT 10. The stems 113 fit into the major slot 16 of the MPT 10 in actual operation. Also included for adjustable tension during fastening operation, is a washer 115.

The washer 115 also provides support for the key 110, inserted in the major slot 16 which is used, in the preferred embodiment, to lock a cellphone case 100 to the MPT 10 at some varied tension, as shown in FIG. 21. That position is then locked in place by the mechanical latching effect of a key pin 120, and the two-part semi-circular overhang 17 on the MPT 10.

FIG. 19 illustrates a component referred to as a key pin 120. The key pin 120 comprises a cap 121 and a shaft 122. The hole 114 in the previously-described key 110 is dimensioned to accept the shaft 122 of the key pin 120. By this operation, the key pin 120 functions to push the stems 113 apart by means of a slight bending of the crevice 112 at the end of the shank 115 of the key 110. The effect of pushing the stems 113 further apart causes both stems 113 to press against the walls of the overhang 17 on the MPT 10, thus allowing the key 110 to become jammed and immovable from that position.

FIG. 20 is an illustration of the magnetic shield 130 which is placed inside and flush with the inner wall 93 of the floater 90.

FIG. 21 illustrates a bottom view of the MPT 10 into an assembly 140, which consists of the MPT 10 with the key 110 having been inserted through the opening 19. The key 110 is then turned radially so as to enable the stems 113 of the key 110 to engage the overhangs 17 of the MPT 10.

FIG. 22 depicts the top view of an assembly 150, which comprises a view of the bed 103 of a case 100 to which has been attached the key 110, key pin 120, washer 115 (not shown), gear pin 70, and the MP 50 (not shown). The flanges 73 of the gear pin 70 are shown protruding through the crescents 101 of the case 100. The table 118 of the key 110 is visible, along with the cap 121 of the pin 120 inserted in the key 110.

FIG. 23 depicts a bottom view of the foregoing assembly 150, further showing a view of the undersurface 103(*b*) of the case 100 and further showing the protruding inner wall 93 of the floater 90, the floater magnetic shield 130, and the bottom surface of the PB 20

The head top 160 is shown in FIG. 24 and demonstrates the area where the plunger bottom (PB) 170 will be mated and attached. The head top 160, essentially replaces the MPT 10 because, like the MPT 10, its design would be dependent on the attachments used. In this exemplary, it is being attached to an undergarment 218 (not shown) worn by the user, on their torso. The Head top has the same tabs 13 and the square spike 18, used as an indicator in the alignment with the PB 170. The deviation involves a small deck 162 and some mounting posts 163 that will facilitate strapping 211, 212 (not shown) the device in place to prevent appreciable movement of the Head top 160 in any direction relative to the undergarment 218 (not shown), or whatever it is attached.

FIG. 25 is a bottom view of the head top 160.

FIG. 26 shows the array of magnets 21, 29, and other details of the mated plunger bottom PB 170 relative to the mating PB 20. It is important to note the changes in the polarity of the magnets in the two variations of the plunger bottoms 20, 170. The polarity of the large magnets 21 as displayed in FIG. 26 remains the same, however the polarity of the smaller magnets 29 is reversed.

FIG. 27 presents an assembly, being the complete Head 180, the view being the undersurface of the base 22 of the PB 170.

FIG. 28 shows a component referred to as a foam wedge 190. As shown, the foam wedge 190 is a solid structure having a cross-section of an isosceles triangle. In one embodiment of the Magnet Button 1, the foam wedge 190 may be attached to the back of the HT 160 in order to change the displacement of the HT 160 so that the combined components 200 (see FIG. 29) allow the complete head 180 to hang from a user's torso with a more vertical orientation that is more perpendicular to the surface on which the user may be standing. The foam wedge 190 also allows the head 180 to be more shock absorbent while keeping the weight of the apparatus at a minimum.

FIG. 29 illustrates an assembly 200 comprising the foam wedge 190 being attached to the underside of the deck 162, and ultimately forming attachment to the complete head 180.

FIG. 30 depicts an assembly 210 which illustrates the top view of an embodiment which combines several optional components for ease of use of the head 180, in conjunction with attachment to a user's garment 218. The scenario shown in FIG. 30 is that of a compartment 217 which is sewn onto an undergarment 218 as a guide to the user as to where the head plunger assembly 200 should be placed. The compartment 217 also contains short straps 211 and long straps 212 attached to the compartment 217. The pairings of straps 211, 212 are intended to overlap each other across the assembly 200 with the slits 213 coming to rest over the posts 163 during the process and adhere themselves to each in a tight embrace, As the straps 211, 212 wrap around the head assembly 200, so too, the slits 213 in the straps wrap around the deck posts 163 for enhanced rigidity and stability.

FIG. 31 demonstrates use of the head for fastening to a user's clothing. A cellphone, in its carrying case 100, is shown.

What is claimed is:

1. An apparatus for the secure carriage of a portable electronic device, the apparatus comprising:
    a main plunger having an internally-fixed array of disc magnets;
    a head plunger having an internally-fixed array of disc magnets;
    a case for removably carrying the portable electronic device supported by the main plunger;
    wherein the internally-fixed array of disc magnets of the main plunger is configured to create a magnetic latch with the internally-fixed array of disc magnets of the head plunger when the main plunger is positioned adjacent to the head plunger in a first alignment; and
    wherein the internally-fixed array of disc magnets of the main plunger is configured to release the magnetic latch with the head plunger when the main plunger is positioned adjacent to the head plunger in a second alignment.

2. The apparatus of claim 1 further comprising a magnetic shield positioned between the internally-fixed array of disc magnets of the main plunger and the case.

3. The apparatus of claim 1 further comprising an annular magnetic shield positioned around an outer perimeter of the internally-fixed array of disc magnets of the main plunger.

4. The apparatus of claim 1 wherein the case is configured to rotate with respect to the main plunger when the case is carrying the portable electronic device, and wherein the case is configured to be rotationally fixed with respect to the main plunger when the case is not carrying the portable electronic device.

5. The apparatus of claim 1 further comprising straps or a garment for supporting the head plunger adjacent to a part of a human body.

6. An apparatus for the secure carriage of a portable electronic device an object, the apparatus comprising:
    a main plunger comprising an planar, circular-shaped structure having an internally-fixed array of four large disc magnets and five small disc magnets arrayed in the main plunger;
    a head plunger comprising an planar, circular-shaped structure corresponding is size and shape to the main plunger having an internally-fixed array of four large disc magnets and five small disc magnets arrayed in the head plunger;
    a case for removably carrying the portable electronic device supported by the main plunger;
    wherein the internally-fixed arrays of disc magnets of the main and head plungers have polarity patterns configured to create a magnetic latch between the main and head plungers when the main plunger is positioned adjacent to the head plunger in a first alignment; and
    wherein the polarity patterns of the main and head plungers are configured to release the magnetic latch when the main plunger is positioned adjacent to the head plunger in a second alignment.

7. The apparatus of claim 6 wherein a magnetic shield is positioned between the main head and the case.

8. The apparatus of claim 6 wherein an annular magnetic shield is positioned around a perimeter of the internally-fixed array of disc magnets of the main plunger.

9. The apparatus of claim 6 wherein the case is configured to rotate with respect to the main plunger when the case is carrying the portable electronic device, and wherein the case is configured to be rotationally fixed with respect to the main plunger when the case is not carrying the portable electronic device.

10. The apparatus of claim 6 comprising straps or a garment for supporting the head plunger adjacent to a part of a human body.

11. The apparatus of claim 6 wherein the portable electronic device comprises a cellphone.

12. An apparatus for supporting and transporting a portable electronic device using magnets, comprising:
  a main plunger and a head plunger configured to magnetically latch to each other;
  a case for carrying the portable electronic device supported by the main plunger;
  the main plunger comprising a plurality of magnets including a main plunger array of large disc magnets and a main plunger array of small disc magnets;
  the head plunger comprising a plurality of magnets including a head plunger array of large disc magnets and a head plunger array of small disc magnets;
  the main plunger array of large disc magnets forming a main plunger large disc pattern of alternating north and south polarity magnets;
  the head plunger array of large disc magnets forming a head plunger large disc pattern of alternating north and south polarity magnets;
  the main plunger array of small disc magnets forming a main plunger small disc pattern of like polarity magnets;
  the head plunger array of small disc magnets forming a head plunger small disc pattern of like polarity magnets, wherein the polarity of the main plunger small disc magnets is opposite to the polarity of the head plunger small disc magnets;
  wherein magnet positions of the main plunger large disc pattern correspond to magnet positions of the head plunger large disc pattern, and wherein magnet positions of the main plunger small disc pattern correspond to magnet positions of the head plunger small disc pattern;
  wherein the small magnets supplement attraction of the large magnets when the main plunger is positioned adjacent to the head plunger in a first alignment, and the small magnets oppose repulsion of the large magnets when the main plunger is positioned adjacent to the head plunger in a second alignment;
  wherein the large and small magnets create a latch between the main plunger and the head plunger when positioned adjacent each other in the first alignment, and wherein the latch is released when the main plunger is rotated with respect to the head plunger to the second alignment.

13. The apparatus of claim 12, further comprising:
  opposing gear teeth on the main plunger and the case configured to allow rotational movement of the case with respect to the main plunger; and
  a gear pin maintained our of engagement with the gears allowing for rotation of the case with respect to the main plunger without unlatching the main plunger form the head plunger
  when the mobile device is removed from the case, that releases the gear pin to block rotation of the case with respect to the main plunger, to allow unlatching of the main plunger form the head plunger through rotation of the case with respect to the head plunger
  a spring positioned between the case and the main plunger, positioning the mobile device in the case compresses the spring to move the gear pin to unblock rotation of the case with respect to the main plunger
  removal of the mobile form the case causes the spring to expand to move the gear pin to block rotation of the case with respect to the main plunger.

14. The apparatus of claim 12 wherein the main plunger comprises a first radial gear, and the case comprises a second radial gear corresponding to the first radial gear of the main plunger, and the first and second radial gears rotationally interface with each when the case rotates with respect to the main plunger.

15. The apparatus of claim 12 further comprising a magnetic shield positioned between the internally-fixed array of disc magnets of the main plunger and the case.

16. The apparatus of claim 12 further comprising an annular magnetic shield positioned around an outer perimeter of the internally-fixed array of disc magnets of the main plunger.

17. The apparatus of claim 12 wherein the case is configured to rotate with respect to the main plunger when the case is carrying the portable electronic device, and wherein the case is configured to be rotationally fixed with respect to the main plunger when the case is not carrying the portable electronic device.

18. The apparatus of claim 12 further comprising straps or a garment for supporting the head plunger adjacent to a part of a human body.

19. The apparatus of claim 12 wherein the portable electronic device comprises a cellphone.

20. The apparatus of claim 12 further comprising a floater, wherein the floater is configured to move adjacent to the rotation of the main plunger when the case is carrying an electronic device to further restrict planar movement of the main plunger relative to the head plunger to support the latch between the main plunger and the head plunger when positioned adjacent to each other in the first alignment.

* * * * *